United States Patent
Muhlbacher et al.

(10) Patent No.: US 6,443,485 B1
(45) Date of Patent: Sep. 3, 2002

(54) PROTECTIVE DEVICE FOR SIDE-ON COLLISIONS

(75) Inventors: Richard Muhlbacher, Grassau; Rainer Bartl, Assling, both of (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/554,936

(22) PCT Filed: Nov. 20, 1998

(86) PCT No.: PCT/EP98/07490

§ 371 (c)(1),
(2), (4) Date: Jul. 10, 2000

(87) PCT Pub. No.: WO99/26814

PCT Pub. Date: Jun. 3, 1999

(30) Foreign Application Priority Data

Nov. 20, 1997 (DE) ...................................... 297 20 619 U

(51) Int. Cl.[7] .......................... B60R 21/20; B60R 21/22
(52) U.S. Cl. ................................ 280/730.2; 280/728.1; 280/728.3
(58) Field of Search .......................... 280/730.2, 730.1, 280/728.1, 728.2, 728.3, 751; 296/189, 39.1

(56) References Cited

U.S. PATENT DOCUMENTS

| | | | | |
|---|---|---|---|---|
| 5,273,309 A | * | 12/1993 | Lau et al. ................. | 280/730.2 |
| 5,362,102 A | * | 11/1994 | Hajek et al. ................. | 280/751 |
| 5,605,346 A | * | 2/1997 | Cheung et al. ........... | 280/728.2 |
| 5,641,177 A | | 6/1997 | Berg et al. | |
| 5,755,457 A | * | 5/1998 | Specht ..................... | 280/730.2 |
| 5,788,270 A | * | 8/1998 | Haland et al. ........... | 280/730.2 |
| 5,791,683 A | * | 8/1998 | Shibata et al. ........... | 280/730.2 |
| 5,884,937 A | * | 3/1999 | Yamada .................... | 280/730.2 |
| 5,957,487 A | * | 9/1999 | Stutz ........................ | 280/730.2 |
| 6,007,752 A | * | 12/1999 | Scherzer et al. ............ | 264/136 |
| 6,079,732 A | * | 6/2000 | Nakajima et al. ........ | 280/728.2 |

FOREIGN PATENT DOCUMENTS

| | | |
|---|---|---|
| DE | 34 22 263 C2 | 2/1988 |
| DE | 296 03 316 U1 | 8/1996 |
| DE | 296 05 897 U1 | 9/1996 |
| DE | 196 47 679 A1 | 6/1997 |
| DE | 196 12 229 A | 10/1997 |
| EP | 0 694 444 A2 | 1/1996 |
| EP | 0 791 511 A1 | 2/1997 |
| EP | 0 795 455 A1 | 9/1997 |
| EP | 0 872 390 A | 10/1998 |
| JP | 3-258636 A * | 11/1991 |
| WO | WO 96/07563 * | 3/1996 |
| WO | WO 99/26814 | 6/1999 |

* cited by examiner

Primary Examiner—Lanna Mai
Assistant Examiner—Ruth Ilan
(74) Attorney, Agent, or Firm—Brooks & Kushman P.C.

(57) ABSTRACT

A protective device against side impacts for passengers in an automotive vehicle comprises at least one inflatable airbag which in its folded state is arranged behind at least one A column covering and whose interior communicates with a gas generator.

To provide a sufficiently stable covering while permitting an unobstructed exiting of the airbag to protect a passenger, the A column covering is manufactured from a material particularly resistant to bending and has a pivot line (6) which extends substantially in the longitudinal direction of the A column and around which at least one covering section of the A column covering can be pivoted to release an outlet gap for the airbag relative to the A column in the direction of the passenger compartment.

7 Claims, 2 Drawing Sheets

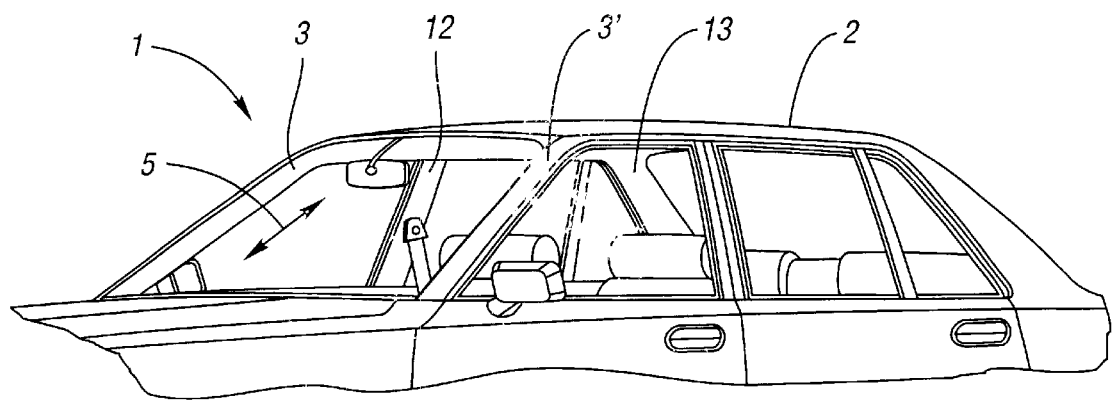
Fig. 1
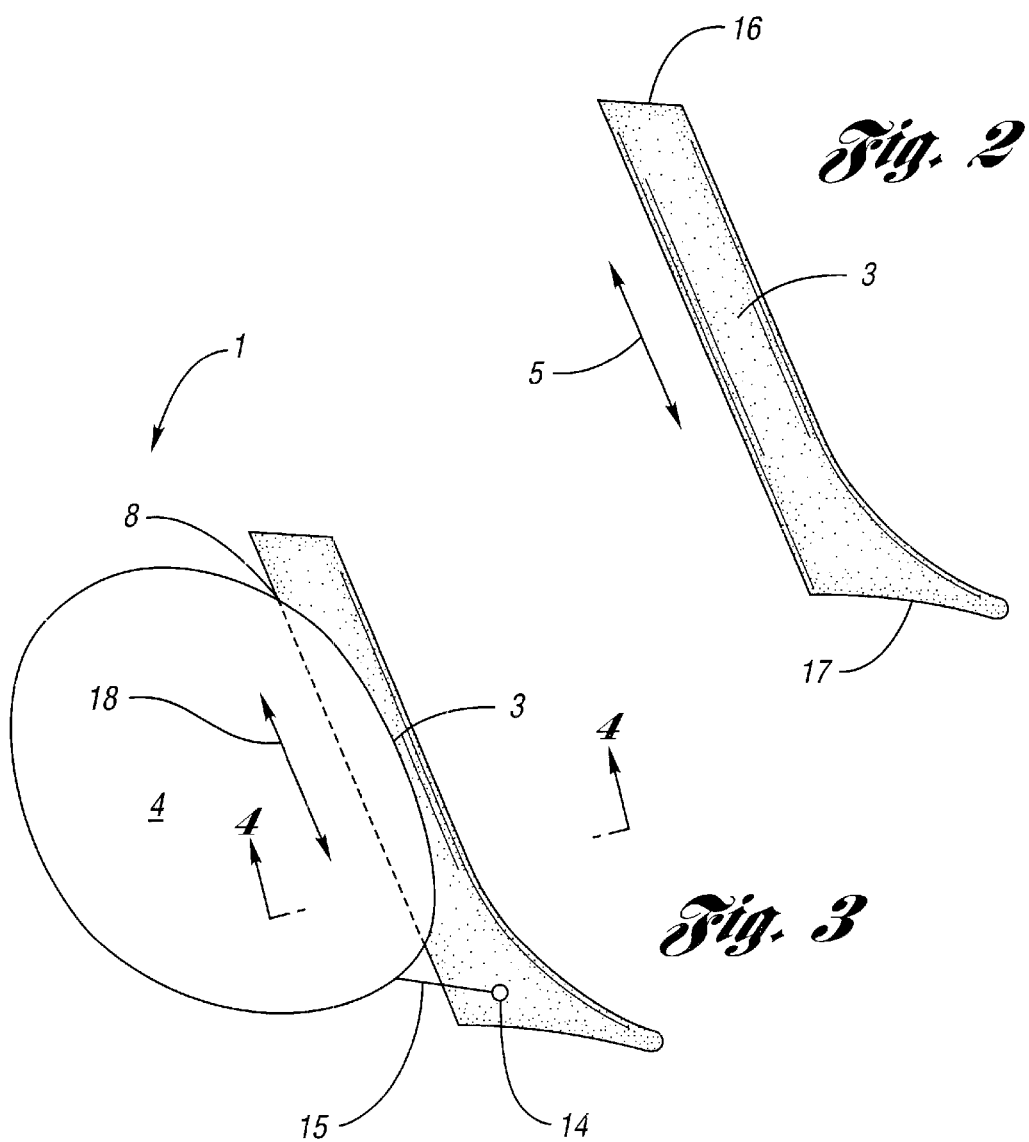
Fig. 2
Fig. 3

PROTECTIVE DEVICE FOR SIDE-ON COLLISIONS

The present invention relates to a protective device against side impacts for passengers in an automotive vehicle, the device comprising at least one inflatable airbag which in its folded state is arranged behind at least one A column covering.

Such a protective device against side impacts is known from DE 29 605 897. In the prior-art protective device an airbag is positionally fixed in a plastic sleeve and arranged behind a covering in the area of an A column and a roof frame. The airbag communicates at one end with a gas generator and extends in its inflated state over a lateral portion in the vehicle to protect, in particular, a passenger's head against injuries.

In view of the already known protective device against side impacts, it is the object of the subject matter of the application to provide a sufficiently stable covering while permitting an unobstructed exiting of the airbag to protect a passenger.

This object is achieved with the A column covering being made from a material particularly resistant to bending and a pivot line which extends substantially in the longitudinal direction of the A column and around which at least one covering section of the A column covering is pivotable to release an outlet gap for the airbag relative to the A column in the direction of the passenger compartment.

The flexural strength of the A column covering makes sure that the covering is sufficiently stable and substantially self-supporting and that complicated fastening means for fastening the covering to the A column are not required. At the same time, the A column covering which is resistant to bending provides a certain protection for the passenger upon contact with the A column or A column covering, whereby the airbag folded behind the A column covering and the supply line thereof and possibly the gas generator are simultaneously protected against impacts, or the like, from the outside.

To enable the airbag to exit in an easy and reliable manner in case of emergency despite the use of a bending resistant material for the A column covering, the A column covering has a pivot line. Upon inflation of the airbag at least one covering section of the A column covering is pivoted around said pivot line to release an outlet gap. As a result, the A column covering need not be detached as a whole from the A column to permit an inflation of the airbag.

An A column covering can be made from a bending resistant material in a simple way by using e.g. a mixed-fiber nonwoven material. Said material can be cut to size and shaped accordingly.

Preferably, such a mixed-fiber nonwoven material as a needled mixed-fiber nonwoven material may be composed of reinforcing fibers and matrix fibers. Different materials can be used for the various fibers. Flax, in particular, is used for the reinforcing fibers because of its availability and recyclability. A material which is preferred for the matrix fibers because of its characteristics is polypropylene. In a preferred embodiment, the mixing ratio of the components may be 50:50, based on weight percent.

To obtain an optically attractive surface and to enhance the flexural strength in addition, a decoration material may be laminated onto a visible side of the A column covering.

Thanks to the self-supporting structure and the flexural strength of the A column covering, there is e.g. no gluing over the whole surface of the A column, but a few fixing means are sufficient for a detachable fastening to the A column. Preferably, such fixing means may be arranged on a rear side of the A column covering that is opposite to the visible side.

A simple embodiment for such a fixing means can be realized by forming the fixing means in a per se known manner by way of a clip and a retainer detachably holding the same.

Said fixing means may e.g. be used for pivoting the A column covering as a whole, with the pivot line extending here along fixing means arranged in asymmetry with the A column covering. For instance, said fixing means are arranged at one side in offset fashion relative to a center line of the A column covering which extends in the longitudinal direction of the A column, and upon inflation of the airbag the A column covering is pivoted around the fastening points between A column and A column covering. As a result, the covering section extending over the center line up to the fixing means is lifted from the A column to such an extent that the airbag can exit through the outlet gap formed thereby.

In a further embodiment the pivot line may extend along a weakened material portion formed in the A column covering. An example of a weakened material portion is a film hinge or also a projection projecting preferably at a rear side of the A column covering. Upon inflation of the airbag the covering section which is respectively extending up to the weakened or reinforced material portion is pivoted for releasing an outlet gap for the airbag.

A further possibility of implementing a pivot line follows e.g. from the measure that the pivot line is formed by a press line which separates surfaces of the A column covering that have been pressed to differently strong degrees. For instance, in such a case a more weakly pressed covering section will pivot outwards in relation to a more strongly pressed covering section along the press line upon inflation of the airbag.

Instead of covering sections that have been pressed to differently strong degrees, covering sections of a different structure or different composition may be used, of which one respective covering section can be pivoted along a corresponding pivot line relative to the other covering section upon inflation of the airbag. Moreover, it is possible to combine the above-mentioned different configurations of pivot lines with one another, a combination being also possible with the fixing means which are arranged in asymmetry with the center line of the A column covering.

For instance, in order to arrange an airbag not only in the area of the A column, the coverings of B and/or C and/or D column may be constructed by analogy with the A column covering. As a result, in the whole lateral area the passengers are protected by airbags, in particular in the head area, at the front and also at the rear inside the vehicle. Furthermore, there is the possibility that one airbag exits to the front and one to the rear in a corresponding manner, for instance by way of a corresponding covering of the B column; in this case the B column covering has two pivotable covering sections for the two airbags. For instance, an airbag in the area of the A column might thus be dispensed with.

In modem automotive vehicles having low Cd values, A and C or D columns are inclined to the rear and to the front, respectively, to a relatively strong degree so that these pass into one another in the roof area. With such a design, the A and C or D column coverings can be made integral in an analogous manner.

To fix the inflated airbag, holding points may be arranged for the airbag in the area of the A and C or D column, in particular at the lower end thereof. The airbag may be connected to said holding points via restraints, belts, or the like. This applies by analogy to several airbags exiting from the various column coverings or to an integral airbag having sections exiting in the area of the various columns.

Advantageous embodiments of the present invention shall now be explained and described in more detail with reference to the figures attached to the drawing, in which:

FIG. 1 is a partial basic view showing an automotive vehicle with A, B and C columns;

FIG. 2 is a side view of an A column covering;

FIG. 3 shows the A column covering of FIG. 2 in the inflated state of the airbag;

Figure 4:
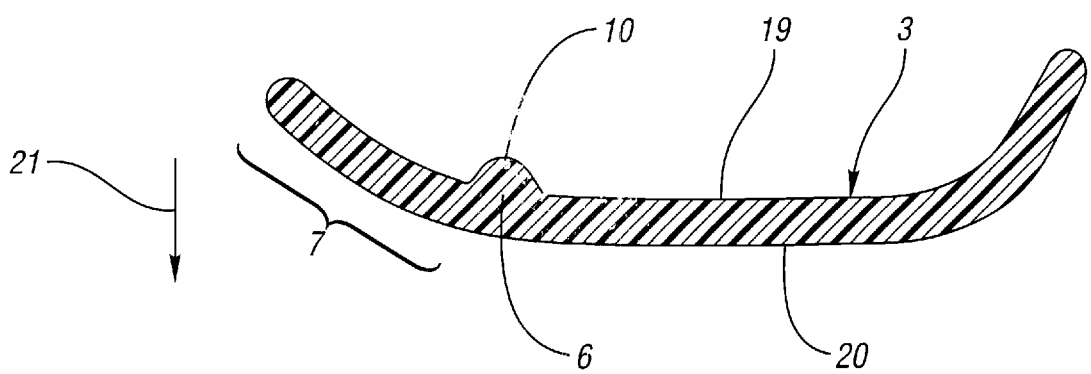
FIG. 4 is a section taken along line IV—IV of FIG. 3, in a first embodiment.

FIG. 1 is a partial basic view showing an automotive vehicle 2 with a protective device 1 against side impacts. The device comprises an airbag (not shown) which in its folded state is arranged in the area of at least one column below the corresponding covering 3, 12, 13. Furthermore, the protective device 1 against side impacts comprises the corresponding covering of the respective column; in the following text a protective device against side impacts will in particular be described with reference to the area of the A column 3. By analogy, the protective device 1 against side impacts may also comprise corresponding airbags in the area of the B column or C column covering 12, 13. In the illustrated vehicle, a D column with a covering that is normally found in other vehicles is missing. Said column covering may have the same structure as the A column covering.

FIG. 2 is a lateral view on an A column covering 3 as arranged on an inside within the passenger compartment of the automotive vehicle 2 on the A column 3.

The A column covering 3 extends in the longitudinal direction 5 of the A column and has an upper end 16 and a lower end 17. With the help of a plurality of fixing means 9, see FIG. 6, the A column covering 3 is detachably secured at its rear side 19 to the A column. A folded airbag, the interior of which communicates with a gas generator (not shown), is arranged between A column covering 3 and the respective column.

FIG. 3 illustrates the A column covering 3 of FIG. 2 in the inflated state of the airbag 4. Depending on the arrangement of the gas generator relative to the airbag, the airbag will open in the opening directions 18 from the lower end 17 to the upper end 16 of the A column covering 3, or vice versa. Upon inflation of the airbag 4 an outlet gap 8 is formed between the A column covering 3 and the associated A column in that a covering section 7 (see the following figures) is pivoted with respect to the remaining A column covering to the inside towards the passenger compartment.

For the fixation of the inflated airbag 4, the latter is normally connected to the holding point 14 via belt 15, with FIG. 3 illustrating a holding point 14 at the lower end 17 of the A column covering 3. A further holding point 14 may e.g. be arranged in the area of the B column covering 12 or C column covering 13 or on the corresponding column.

Figure 5:
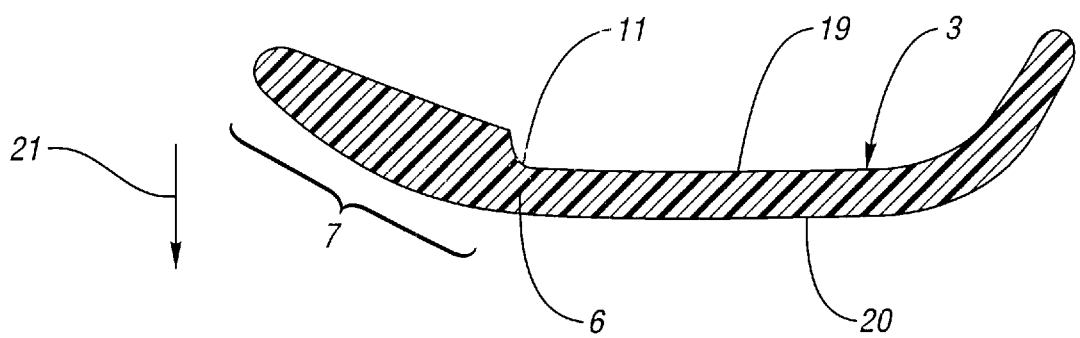
FIG. 5 is a section taken along line IV—IV of FIG. 3, in a second embodiment.
Figure 6:
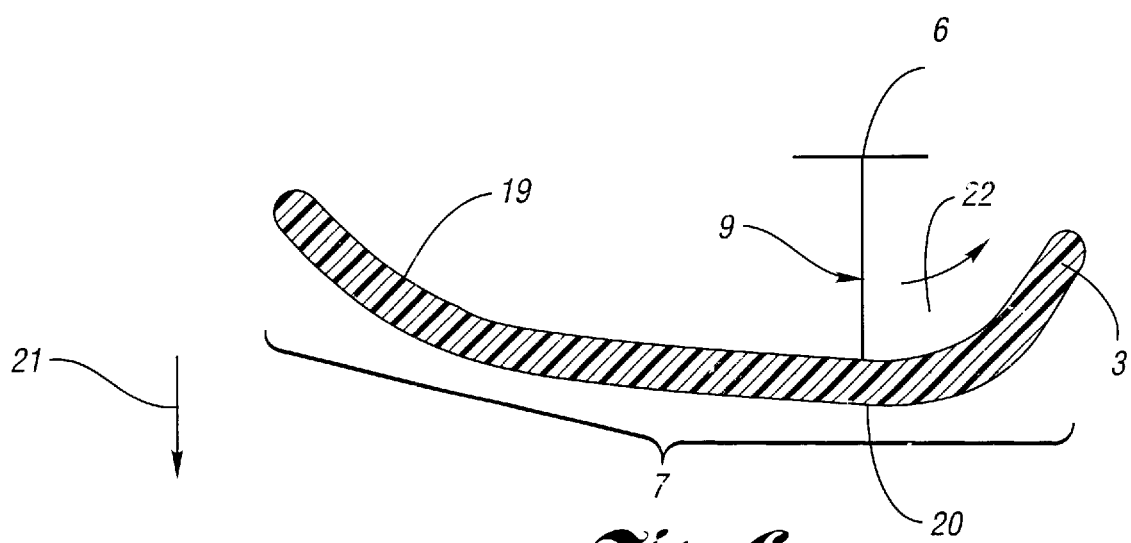
FIG. 6 is a section taken along line IV—IV of FIG. 3, in a third embodiment.

FIGS. 4 to 6 are each a section taken along line IV—IV of FIG. 3, the figures illustrating different embodiments of A column coverings 3.

In FIG. 4, a pivot line 6 around which a covering section 7 of the A column covering 3 can be pivoted in direction 21 towards the passenger compartment is defined by a projection 10 projecting from the rear side 19.

In the second embodiment according to FIG. 5, the pivot line 6 is defined by a press line 11 which separates surfaces of the A column covering 3 that have been pressed to differently strong degrees. In this example, the covering section 7 which in FIG. 5 is positioned at the left side from the press line 11 has been pressed to a smaller degree than the section positioned at the right side from the press line 11.

In the further embodiment shown in FIG. 6, the A column covering 3 on the whole is pivoted around fastening points with the A column as the pivot line 6. The fastening points are formed by fastening corresponding fixing means 9 to the A column. The fixing means 9 is pivoted around the fastening points in the direction 22, whereby the A column covering 3 as covering section 7 is pivoted on the whole in direction 21 towards the passenger compartment. Special attention must here be paid that the fixing means are arranged in asymmetry with the A column covering 3, i.e. at one side relative to a center line (not shown).

Further embodiments of the invention will e.g. follow from a combination of the asymmetrically arranged fixing means 9 of FIG. 6 with the embodiments according to FIG. 4 or 5. Instead of the projection 10 according to FIG. 4, a film hinge may additionally be formed for defining the pivot line 6 in the A column covering 3. Furthermore, it is possible to produce the A column covering 3 from different materials in the covering section 7, see e.g. FIGS. 4 and 5, and in the remaining A column covering 3.

As for the materials used for producing the A column covering 3 and the other column covering, respectively, it should be noted that while having a small weight per unit area these materials should ensure a high flexural strength for the column coverings. A preferred material is a mixed-fiber nonwoven material consisting e.g. of reinforcing fibers and of matrix fibers. A preferred material for the reinforcing fibers is flax and for the matrix fibers polypropylene. These are used for producing a needled mixed-fiber nonwoven material in the ratio of 50:50, based on weight percent.

The retainers for the detachable mounting of the clips, see the above-mentioned fixing means, could e.g. be made from ABS, polyethylene or polypropylene; said retainers may be welded onto the rear side of the respective column covering or secured thereto in another way.

What is claimed is:

1. A protective device (1) against side impacts for passengers in an automotive vehicle (2), comprising at least one inflatable airbag (4) which in its folded state is arranged behind at least one A column covering (3) and whose interior communicates with a gas generator, characterized in that the entire A column covering (3) pivots about a pivot line (6) which is spaced away from the A column covering (3) and connected to the A column covering (3) by a fixing member (9), wherein said pivoting of the A column covering (3) releases an outlet gap for the airbag (4) in the direction of the passenger compartment.

2. The protective device against side impacts according to claim 1, characterized in that the A column covering (3) is made from a mixed-fiber nonwoven material.

3. The protective device against side impacts according to claim 2, characterized in that the mixed-fiber nonwoven material contains reinforcing fibers.

4. The protective device against side impacts according to claim 2, characterized in that the mixed-fiber nonwoven material contains matrix fibers.

5. The protective device against side impacts according to claim 1, characterized in that the fixing member (9) is arranged on a rear side of the A column covering that is opposite to a visible side for the detachable mounting thereof on the A column.

6. The protective device against side impacts according to claim 1, characterized in that the pivot line (6) extends along fixing members arranged in asymmetry with the A column covering (3).

7. The protective device against side impacts according to claim 1, characterized in that the covering (12, 13) of one of a B and C column is constructed the same as the A column covering (3).

* * * * *